(12) United States Patent
Chen

(10) Patent No.: US 10,754,220 B2
(45) Date of Patent: Aug. 25, 2020

(54) DISPLAY DEVICE AND CONTROL METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventor: Pengming Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 184 days.

(21) Appl. No.: 15/940,212

(22) Filed: Mar. 29, 2018

(65) Prior Publication Data

US 2019/0041716 A1 Feb. 7, 2019

(30) Foreign Application Priority Data

Aug. 1, 2017 (CN) .......................... 2017 1 0664167

(51) Int. Cl.
  *G02F 1/17* (2019.01)
  *G02B 30/27* (2020.01)
  *G02F 1/1335* (2006.01)
  *G02B 1/00* (2006.01)

(52) U.S. Cl.
  CPC ............ *G02F 1/172* (2013.01); *G02B 30/27* (2020.01); *G02B 1/005* (2013.01); *G02F 1/133504* (2013.01); *G02F 2001/133562* (2013.01); *G02F 2201/44* (2013.01); *G02F 2202/32* (2013.01)

(58) Field of Classification Search
  None
  See application file for complete search history.

(56) References Cited

U.S. PATENT DOCUMENTS

| | | | | |
|---|---|---|---|---|
| 2004/0227455 | A1* | 11/2004 | Moon | G02F 1/01 313/501 |
| 2009/0060410 | A1 | 3/2009 | Hoshi et al. | |
| 2012/0026303 | A1* | 2/2012 | Ezhov | H04N 13/324 13/324 |
| 2013/0271445 | A1 | 10/2013 | Park et al. | |
| 2014/0375913 | A1* | 12/2014 | Jen | G02B 30/27 349/15 |
| 2015/0002765 | A1* | 1/2015 | Liu | G02B 3/12 349/15 |

(Continued)

FOREIGN PATENT DOCUMENTS

| | | |
|---|---|---|
| CN | 103376595 A | 10/2013 |
| CN | 103995403 A | 8/2014 |

(Continued)

OTHER PUBLICATIONS

First Office Action issued in related Chinese Patent Application No. 201710664167.1, dated Aug. 30, 2019, with English translation.

*Primary Examiner* — William R Alexander
*Assistant Examiner* — Gary W O'Neill
(74) *Attorney, Agent, or Firm* — McDermott Will & Emery LLP

(57) ABSTRACT

A display device includes: a display panel and a photonic crystal grating disposed on a light-emitting side of the display panel; wherein the photonic crystal grating has a fully light-transmitting state and a grating state used for 3D display.

16 Claims, 8 Drawing Sheets

(56) References Cited

U.S. PATENT DOCUMENTS

2015/0219970 A1* 8/2015 Liu .................. G02F 1/134309
349/12

FOREIGN PATENT DOCUMENTS

| CN | 104280889 A | 1/2015 |
| KR | 10-2009-0120733 A | 11/2009 |
| WO | WO-2015010573 A1 * | 1/2015 |

* cited by examiner

20

DISPLAY DEVICE AND CONTROL METHOD THEREOF

CROSS-REFERENCE TO RELATED APPLICATION

This application claims benefit and priority to Chinese Patent Application No. 201710664167.1, filed on Aug. 1, 2017, titled "DISPLAY DEVICE AND CONTROL METHOD THEREOF", which is incorporated herein by reference in its entirety.

TECHNICAL FIELD

The present disclosure relates to a field of display technology, and in particular, to a display device and a control method thereof.

BACKGROUND

At present, 3D (three-dimensional) display, with its true and vivid expression, beautiful and elegant environmental appeal and strong and shocking visual impact, is favored by the vast number of consumers. The principle of 3D (three-dimensional) display is that the left and right eyes of a viewer respectively receive images with subtle differences, that is, a left-eye image and a right-eye image, and the two images are integrated after comprehensive analysis by the viewer's brain, thus the viewer perceives the depth of the object displayed on the screen, in turn a three-dimensional impression is generated.

Early 3D display devices require the viewers to wear corresponding 3D glasses, making their application subject to the location and equipment limitations. A naked-eye 3D display device developed in recent years overcomes the defects of the early 3D display device, making the naked-eye 3D display device widely used.

SUMMARY

In one aspect, the present disclosure provides a display device. The display device includes: a display panel and a photonic crystal grating disposed on a light-emitting side of the display panel; wherein the photonic crystal grating has a fully light-transmitting state and a grating state which is used for 3D display.

Optionally, the photonic crystal grating includes a first electrode layer and a second electrode layer disposed oppositely, and a photonic crystal layer disposed between the first electrode layer and the second electrode layer. The photonic crystal layer includes a liquid medium layer and charged particles, the charged particles being distributed in a lattice structure in the medium layer and capable of moving in the medium layer under an action of an electric field, wherein the first electrode layer includes a plurality of stripe-shaped electrode units arranged side by side in a horizontal viewing direction of the display panel.

Optionally, the plurality of stripe-shaped electrode units are arranged side by side with an interval between the adjacent two stripe-shaped electrode units.

Optionally, both of the width of a single stripe-shaped electrode unit and the interval between the adjacent two stripe-shaped electrode units are designed so small that the human eyes can't tell them.

Optionally, both of the width of a single stripe-shaped electrode unit and the interval between the adjacent two stripe-shaped electrode units are designed in the range of micrometers.

Optionally, grating parameters of the photonic crystal grating under the grating state are adjusted by controlling a voltage of each of the stripe-shaped electrode units; the grating parameters comprises locations of light transmitting regions and light-shielding regions formed in the photonic crystal grating under the grating state, and widths of the light-transmitting regions and the light-shielding regions.

Optionally, in the case that the width of each stripe-shaped electrode unit has been determined, the amount of the stripe-shaped electrode units within a light-shielding region or within a light-transmitting region is changed by controlling the voltage of each of the stripe-shaped electrode units, and in turn the widths of the light-shielding regions and the light-transmitting regions are changed.

Optionally, the horizontal viewing direction refers to a horizontal direction when a person views a display screen.

Optionally, the charged particles are at least one selected from the group of metal particles, metal alloy particles or metal compound particles; or the charged particles are particles formed by externally encapsulating a polymer material with a metal material, a metal alloy material, or a metal compound material.

Optionally, the medium layer is colloidal solution.

Optionally, the display device includes two or more photonic crystal gratings arranged in stacks in a direction perpendicular to the board surface of the display panel.

Further optionally, the second electrode layers of the plurality of photonic crystal gratings are connected to the same voltage terminal.

Optionally, the display device includes two photonic crystal gratings arranged in stacks, and the electrode units of the two photonic crystal gratings are perpendicular to each other.

Optionally, an insulator is provided in the interval between the adjacent two stripe-shaped electrode units.

Optionally, one stripe-shaped electrode unit is shaped as an integral whole stripe or is formed of a plurality of sub-electrode units.

In another aspect, a control method of a display device is provided. The method includes: driving the display panel to display a 2D display image and controlling the photonic crystal gratings to be in a fully-light-transmitting state; driving the display panel to display a 3D display image and controlling one of the photonic crystal gratings to be in a grating state.

Optionally, the step of controlling one of the photonic crystal grating(s) to be in a grating state comprises: controlling a voltage of each of the stripe-shaped electrode units in the one of the photonic crystal grating(s) to adjust grating parameters of the photonic crystal grating under the grating state. The grating parameters comprises locations of light-transmitting regions and light-shielding regions formed in the photonic crystal grating under the grating state, and widths of the light-transmitting regions and the light-shielding regions.

Optionally, the display device includes two or more photonic crystal gratings which are arranged in stacks. The step of controlling one of the photonic crystal gratings to be in a grating state includes: acquiring the distance from the viewer to the display device, and controlling one of the photonic crystal gratings which is corresponding to the distance to be in a grating state while other photonic crystal gratings to be in a fully-light-transmitting state.

Optionally, the display device includes first photonic crystal gratings and second photonic crystal gratings which are arranged in stacks, and the electrode units of the first photonic crystal gratings and the electrode units of the second crystal gratings are perpendicular to each other. The step of controlling one of the photonic crystal gratings to be in a grating state in cases when the display panel is in landscape state includes: controlling one of the second photonic crystal gratings to be in a grating state while other of the photonic crystal gratings to be in a fully light-transmitting state; wherein a direction in which the electrode units in the second photonic crystal gratings are arranged is parallel to a horizontal viewing direction of the display panel in landscape state. The step of controlling one of the photonic crystal gratings to be in a grating state in cases when the display panel is in portrait state includes: controlling one of the first photonic crystal gratings to be in a grating state while other of the photonic crystal gratings to be in a fully light-transmitting state; wherein a direction in which the electrode units in the first photonic crystal gratings are arranged is parallel to a horizontal viewing direction of the display panel in portrait state.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art may obtain other drawings according to those drawings without paying any creative effort.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
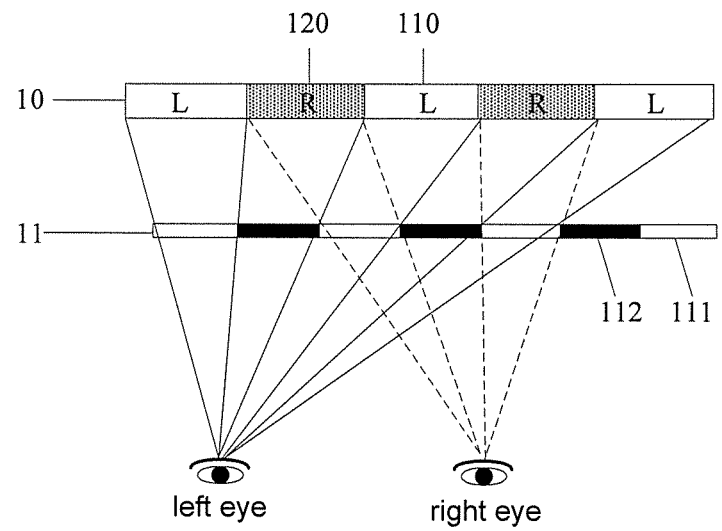
FIG. 1 is a structural diagram of a naked-eye 3D display device provided in an example.

An exemplary naked-eye 3D display device includes, as shown in FIG. 1, a display panel 10 and a grating 11 located on the light-emitting side of the display panel 10. The display panel 10 includes a plurality of first display units 110 and a plurality of second display units 120. The first display units 110 display the left eye image L, and the second display units 120 display the right eye image R. The grating 11 includes a light-transmitting region 111 and a light-shielding region 112. The grating 11 has a function of dividing the image. As shown in FIG. 1, the left eye of a person may see only the left eye image L and the right eye may see only the right eye image R, thereby producing a three-dimensional feeling.

However, the naked-eye 3D display device in the above example can only achieve 3D display, but cannot achieve 2D display, that is, cannot achieve the switch between 3D display and 2D display.

Figure 2:
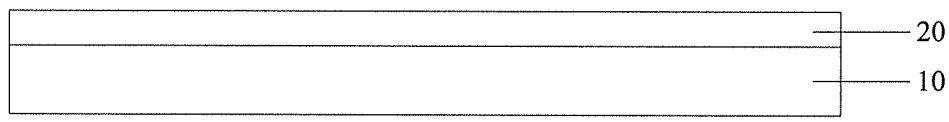
FIG. 2 is a structural diagram of a display device provided by some embodiments of the present disclosure.

Some embodiments of the present disclosure provide a display device, as shown in FIG. 2, includes a display panel 10 and a photonic crystal grating 20 disposed on a light-emitting side of the display panel 10. The photonic crystal grating 20 has a fully light-transmitting state and a grating state which is used for 3D display.

The type of the display panel 10 is not limited, and may be a liquid crystal display panel or an organic electroluminescent diode display panel. In cases when the display panel 10 is a liquid crystal display panel, the display panel 10 includes an array substrate, an opposed substrate, and a liquid crystal layer disposed between the array substrate and the opposed substrate. In cases when the display panel 10 is an organic electroluminescent diode display panel, the display panel 10 includes an anode, a cathode, and a light emitting layer.

It should be noted that the photonic crystals refer to an artificial microstructure formed by periodic arrangement of media with different refractive indexes.

Here, the photonic crystal grating 20 is a grating formed by using the photonic crystals. The structure of the photonic crystal grating 20 is not limited as long as the photonic crystal grating 20 formed by the photonic crystals may be adjusted to a fully light-transmitting state and a grating state which is used for 3D display. In cases when the photonic crystal grating 20 is in a fully light-transmitting state, all the light may pass through the photonic crystal grating 20 and the photonic crystal grating 20 is equivalent to transparent glass. In cases when the photonic crystal grating 20 is in the grating state used for 3D display, the display panel 10 displays a 3D display screen and makes the left eye image displayed by the display panel 10 visible by the viewer's left eye and the right eye image displayed by the display panel 10 visible by the viewer's right eye through the photonic crystal grating 20, so as to achieve 3D display.

Since the display device includes the display panel 10 and the photonic crystal grating 20 disposed on the light-emitting side of the display panel 10 and the photonic crystal grating 20 has a fully light-transmitting state and a grating state which is used for 3D display, in cases when the photonic crystal grating 20 is in the fully light-transmitting state and the display panel 10 displays a 2D display image, the display device may be used to implement 2D display; and in cases when the photonic crystal grating 20 is in a grating state used for 3D display and the display panel 10 displays a 3D display image, the display device may be used to implement 3D display. Therefore, the display device in the embodiments of the present disclosure may achieve the switch between 2D display and 3D display.

Figure 3:
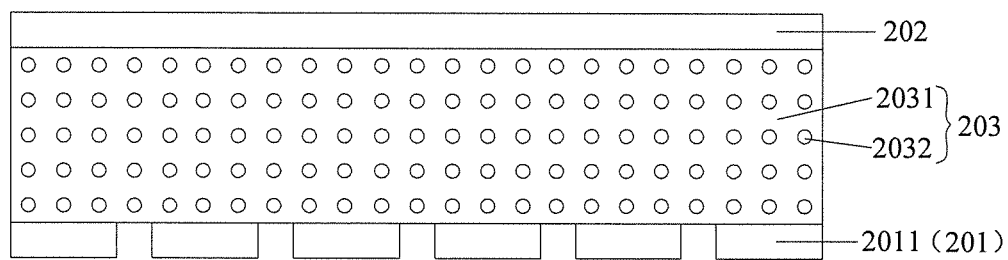
FIG. 3 is a structural diagram of a photonic crystal grating provided by some embodiments of the present disclosure.

As shown in FIG. 3, the photonic crystal grating 20 includes a first electrode layer 201 and a second electrode layer 202 opposite to each other and a photonic crystal layer 203 disposed between the first electrode layer 201 and the second electrode layer 202. The photonic crystal layer 203 includes a liquid medium layer 2031 and charged particles 2032. The charged particles 2032 are distributed in a lattice structure in the medium layer 2031 and are capable of moving in the medium layer 2031 under the action of an electric field. The first electrode layer 201 includes a plurality of stripe-shaped electrode units 2011 arranged side by side in the horizontal viewing direction of the display panel. The plurality of stripe-shaped electrode units 2011 are arranged side by side with an interval between the adjacent two stripe-shaped electrode units. An insulator is provided in an interval between the adjacent two stripe-shaped electrode units, or they may be insulated only by air without providing any insulator.

Figure 4:
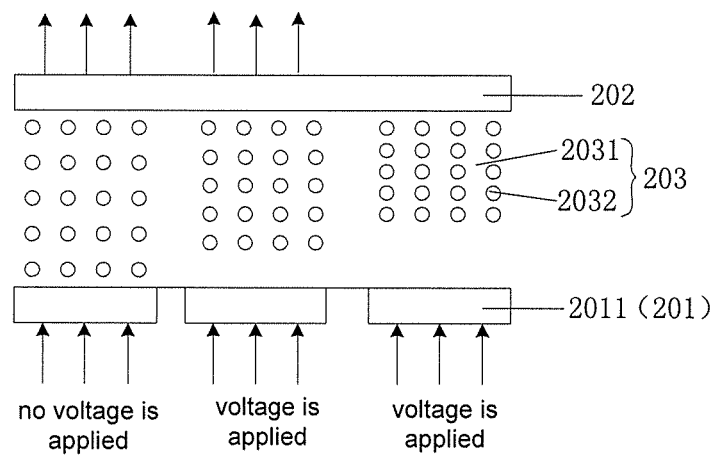
FIG. 4 is a structural diagram of a light-transmitting state of light being changed in cases when different voltages are applied between a second electrode layer and an electrode unit provided by some embodiments of the present disclosure.

The principle that the photonic crystal grating 20 has a fully light-transmitting state and a grating state which is used for 3D display is achieved by using the characteristics of the photonic crystals. As shown in FIG. 4, in cases when the first electrode layer 201 and the second electrode layer 202 are not applied with any voltage, the charged particles 2032 are distributed in the medium layer 2031 with a specific lattice structure, here, light may pass through the photonic crystal grating 20. In cases when the electrode units 2011 in the first electrode layer 201 and the second electrode layer 202 are applied with a voltage, an electric field is formed between the electrode unit 2011 in the first electrode layer 201 and the second electrode layer 202. The electric field drives the charged particles 2032 to move, so that the charged particles 2032 are rearranged to form another lattice structure. The distance between individual charged particles 2032 is controlled by the intensity of the applied electric field, so that different lattice structures are formed. In cases when the voltage between the electrode unit 2011 in the first electrode layer 201 and the second electrode layer 202 is greater than a certain value, here, the light may not pass through the lattice structure formed by the charged particles 2032. In cases when no voltage is applied between the first electrode layer 201 and the second electrode layer 202 or the voltage between the electrode unit 2011 in the first electrode layer 201 and the second electrode layer 202 is less than a certain value, the light may pass through the lattice structure formed by the charged particles 2032. Therefore, the voltage applied to the plurality of stripe-shaped electrode units 2011 in the first electrode layer 201 and the voltage to the second electrode layer 202 may be controlled to form the light-shielding regions and the light-transmitting regions which are alternately arranged, so that a desired grating for 3D display may be formed.

Based on the above, all of the plurality of stripe-shaped electrode units 2011 may be connected to a controller, and the voltage(s) of the plurality of stripe-shaped electrode units 2011 is controlled by the controller. The photonic crystal gratings 20 may form the light-shielding regions and the light-transmitting regions alternately arranged along the horizontal viewing direction, by controlling the voltages of the plurality of stripe-shaped electrode units 2011 in the first electrode layer 201. On this basis, the grating parameters (for example, the locations of the light-transmitting region and the light-shielding region, and the widths of the light-transmitting region and the light-shielding region) of the photonic crystal grating 20 under the grating state may be adjusted, by controlling the voltage of each of the stripe-shaped electrode units 2011. When the grating parameters are changed, the optimal viewing position of the 3D display is changed accordingly.

Figure 5:
FIG. 5(a) is a first structural diagram of a photonic crystal grating being in a grating state of a display device provided by some embodiments of the present disclosure.
FIG. 5(b) is a schematic plan view of FIG. 5(a).
Figure 5:
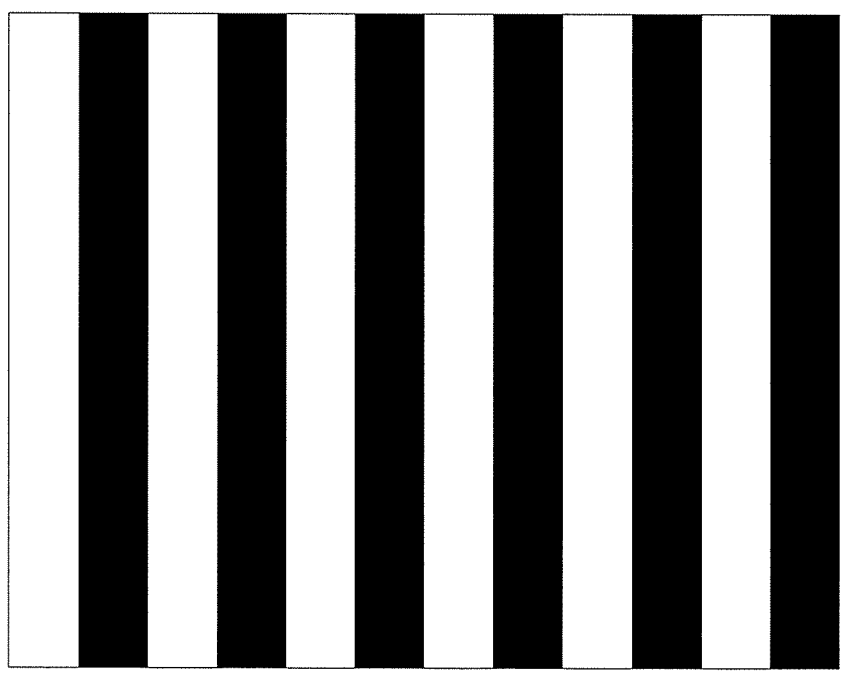
Figure 6:
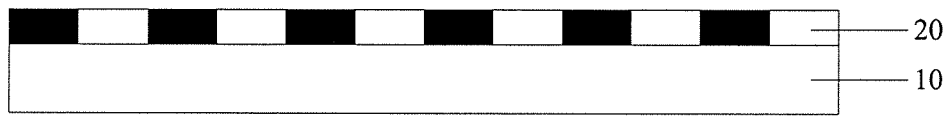
FIG. 6(a) is a second structural schematic diagram of a photonic crystal grating being in a grating state of a display device provided by some embodiments of the present disclosure.
FIG. 6(b) is a schematic plan view of FIG. 6(a).
Figure 6:
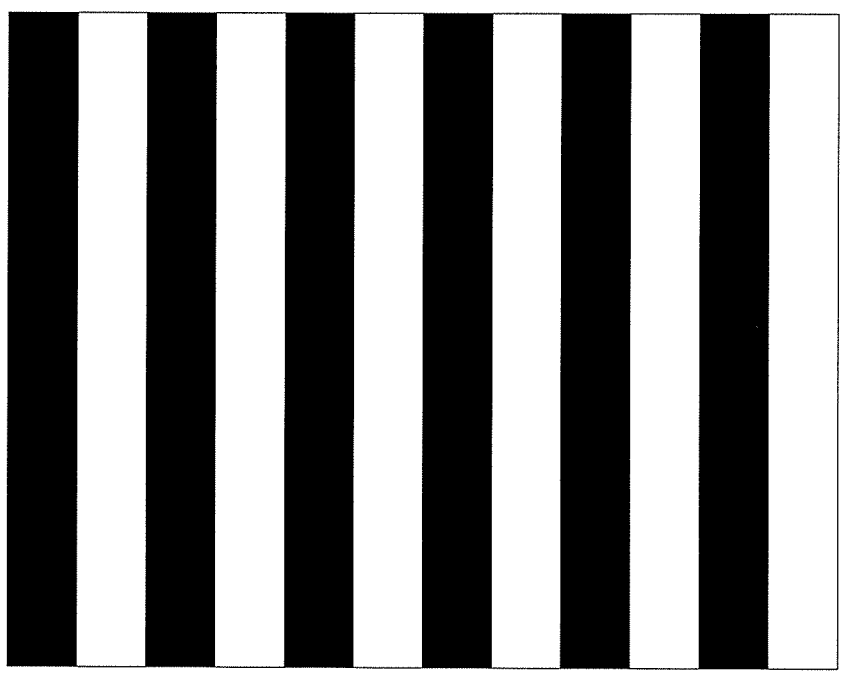
Figure 7:
FIG. 7(a) is a third structural schematic diagram of a photonic crystal grating being in a grating state of a display device provided by some embodiments of the present disclosure.
FIG. 7(b) is a schematic plan view of FIG. 7(a).
Figure 7:
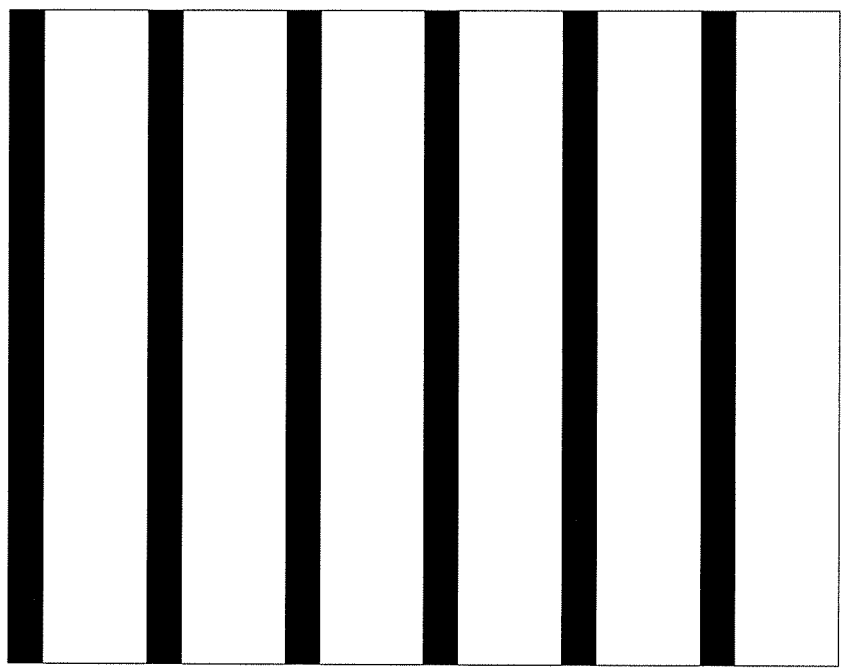

Illustratively, as shown in FIG. 5(b) and FIG. 6(b), the locations of the light-shielding regions and the light-transmitting regions of the photonic crystal grating 20 may be changed, by controlling the voltages of the strip-shaped electrode units 2011. When the 3D display is performed by the display device of FIG. 5(a) and the display device of FIG. 6(a), the optimal 3D viewing position will be changed. As shown in FIG. 7 (b), FIG. 5(b), and FIG. 6(b), the widths of the light-shielding regions and the light-transmitting regions of the photonic crystal grating 20 may also be changed, by controlling the voltages of the stripe-shaped electrode units 2011. The optimal 3D viewing position of the display device of FIG. 7(a) when performing 3D display is also different from the optimal 3D viewing positions of the display device of FIG. 5(a) and the display device of FIG. 6(a).

In some embodiments of the present disclosure, both the width of a single stripe-shaped electrode unit 2011 and the interval between the adjacent two stripe-shaped electrode units 2011 may be designed so small that the human eyes can't tell them, for example, in the range of micrometers. Thus, in the case that the width of each stripe-shaped electrode unit 2011 has been determined, the amount of the stripe-shaped electrode units 2011 within a light-shielding region or within a light-transmitting region can be changed by controlling the voltage of each of the stripe-shaped electrode units 2011, and in turn the widths of the light-shielding regions and the light-transmitting regions of the photonic crystal grating 20 may be changed It should be noted that, the first electrode layer 201 may be close to the display panel 10, or the second electrode layer 202 may be close to the display panel 10. It should be understood by those skilled in the art that the first electrode layer 201 and the second electrode layer 202 are both transparent electrodes. The material of the first electrode layer 201 and the second electrode layer 202 is not limited. For example, the material may be at least one selected from the group of ITO (Indium Tin Oxide), IZO (Indium Zinc Oxide), or FTO (Fluorine-Doped Tin Oxide).

Figure 8:
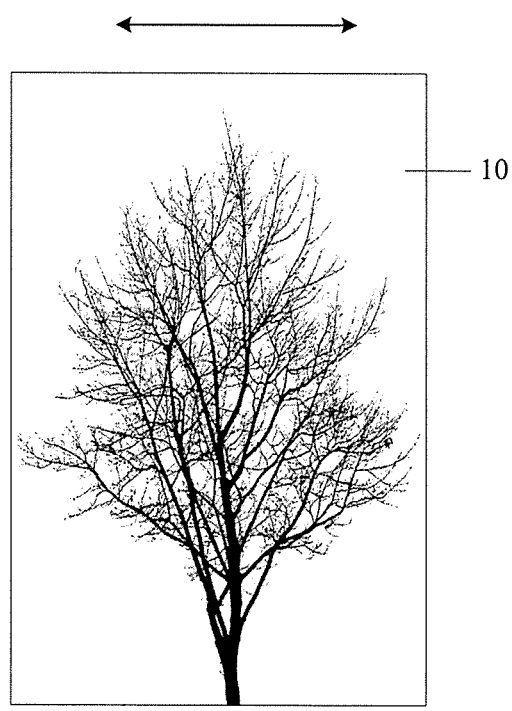
FIG. 8(a) is a horizontal viewing direction of the display device in a portrait state provided by some embodiments of the present disclosure.
FIG. 8(b) is a horizontal viewing direction of the display device in a landscape state provided by some embodiments of the present disclosure.
Figure 8:
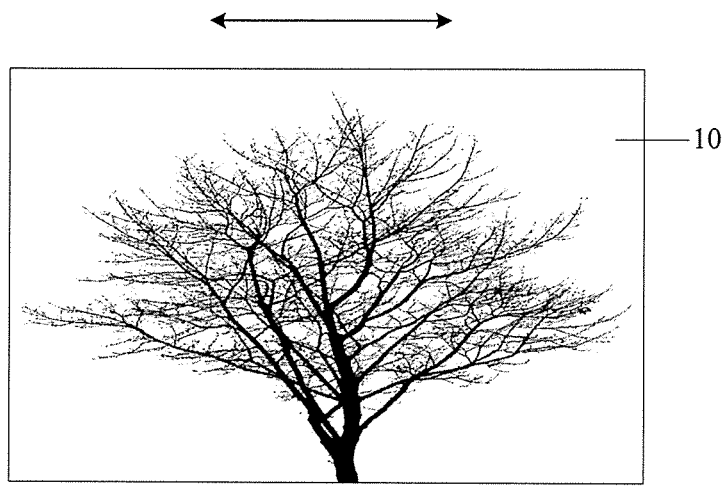

The horizontal viewing direction refers to a horizontal direction when a person views the display screen. Illustratively, as shown in FIG. 8(a) and FIG. 8(b), whether the display panel 10 is in a portrait state or a landscape state, the horizontal viewing direction is a horizontal direction when a person views the display screen, as shown by the arrows in FIGS. 8(a) and 8(b).

Figure 9:
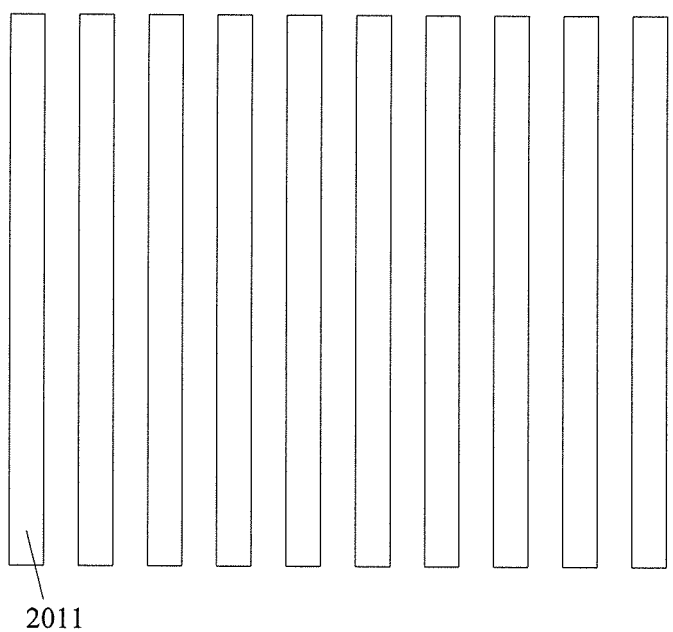
FIG. 9(a) is a first structural diagram of a first electrode layer provided by some embodiments of the present disclosure.
FIG. 9(b) is a second structural diagram of another first electrode layer provided by some embodiments of the present disclosure.
Figure 9:
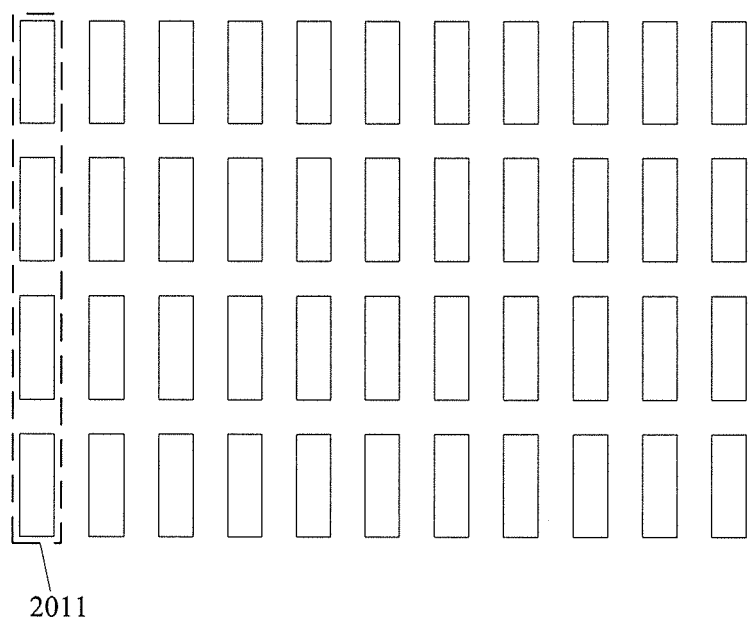

In addition, the stripe-shaped electrode units 2011 may be as shown in FIG. 9(a), i.e., one stripe-shaped electrode unit 2011 is shaped as an integral whole stripe; or the stripe-shaped electrode units 2011 may be as shown in FIG. 9(b), one stripe-shaped electrode unit 2011 is formed of a plurality of sub-electrode units. On this basis, the second electrode layer 202 may be a planar electrode, or may be formed of a plurality of stripe-shaped electrode units.

Here, the charges on the charged particles 2032 are not limited, and the charged particles 2032 may have positive charges or negative charges. On this basis, the charged particles 2032 are arranged in the medium layer 2031 to form a lattice structure. The diameter of the charged particles 2032 is in a range of nanometers or micrometers.

In some embodiments of the present disclosure, the lattice structure formed by the charged particles 2032 may be controlled by controlling the voltages of the second electrode layer 202 and the plurality of strip-shaped electrode units 2011 in the first electrode layer 201, so as to control whether or not the light may pass, thereby controlling the photonic crystal grating 20 to switch between the fully light-transmitting state and the grating state which is used for 3D display. In addition, the grating parameters of the photonic crystal grating 20 may be adjusted by controlling the voltage(s) of the plurality of strip-shaped electrode units 2011 in the first electrode layer 201, so that the display device may achieve the optimal naked-eye 3D display at a plurality of locations.

The charged particles 2032 may be at least one selected from the group of metal particles, metal alloy particles, or metal compound particles. Alternatively, the charged particles 2032 may be particles formed by externally encapsulating a polymer material with a metal material, a metal alloy material, or a metal compound material.

The metal particles may be, for example, metal fine particles made of silicon, titanium, barium, strontium, iron and nickel. The metal alloy particles may be, for example, alloy fine particles made of a metal such as silicon, titanium, barium, strontium, iron and nickel. The metal compound particles may be, for example, metal compound particles formed of silicon, titanium, barium, strontium, iron, and nickel. The polymeric material may be, for example, polystyrene, polyethylene, polypropylene or polyethylene terephthalate (PET) or the like.

Here, the material of the charged particles 2032 may be, for example, polyethylene terephthalate whose surface coats silicon oxide film.

In order to keep the medium layer 2031 stable and make the charged particles 2032 not to precipitate in the medium layer 2031 to effectively exhibit photonic crystal properties, the medium layer 2031 in some embodiments of the present disclosure may be colloidal solution.

On this basis, the colloidal solution is not limited, and may be, for example, gelled toluene.

Illustratively, the charged particles 2032 of the photonic crystal layer 203 of the photonic crystal grating 20 are charged particles formed by the polyethylene terephthalate on its surface coating with silicon oxide film. The diameter of the charged particles 2032 is 100 nm to 200 nm. The medium layer 2031 is gelled toluene having a polarity index greater than 1. The thickness of the photonic crystal layer 203 is 1 mm. In cases when the voltage applied between the stripe-shaped electrode units 2011 in the first electrode layer 201 and the second electrode layer 202 is greater than 5 volts, the electric field intensity where the charged particle 2032 is located is greater than 5V/1 mm=5000 N/C, at this time the charged particles 2032 in the action of the electric field are rearranged to form another lattice structure. According to this lattice structure of the photonic crystals, the electromagnetic wave with the wavelength larger than 300 nm may be blocked from passing, that is, the visible light is blocked. The voltage(s) of some of the stripe-shaped electrode units 2011 of the first electrode layer 201 may be controlled to form the required grating for 3D display.

Figure 10:
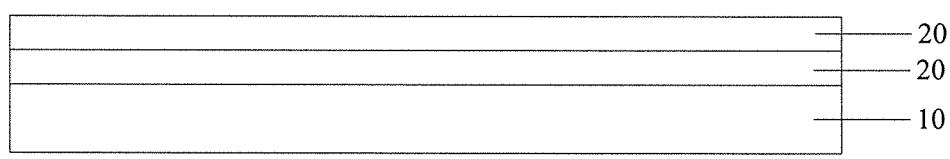
FIG. 10 is a structural diagram of another display device provided by some embodiments of the present disclosure.

As shown in FIG. 10, the display device includes two or more photonic crystal gratings 20 arranged in stacks in a direction perpendicular to the board surface of the display panel 10 (FIG. 10 of the present disclosure shows the display device including two photonic crystal gratings 20 as an example).

In order to avoid mutual influence between the electrode layers of the plurality of photonic crystal gratings 20, an insulating layer (not shown in the drawings of the present disclosure) may be disposed between the adjacent photonic crystal gratings 20. The material of the insulating layer is transparent insulating material.

It should be noted that, in cases when the display device includes two or more photonic crystal gratings 20 arranged in stacks, all of the photonic crystal gratings 20 are in the fully light-transmitting state when the display device is used for 2D display, and one of the photonic crystal gratings 20 is in the grating state for 3D display while the other photonic crystal gratings 20 are in the fully light-transmitting state when the display device is used for 3D display.

Here, in cases when the display device includes a plurality of photonic crystal gratings 20, the second electrode layers 202 of the plurality of photonic crystal gratings 20 may be connected to the same voltage terminal or to different voltage terminals.

Figure 11:
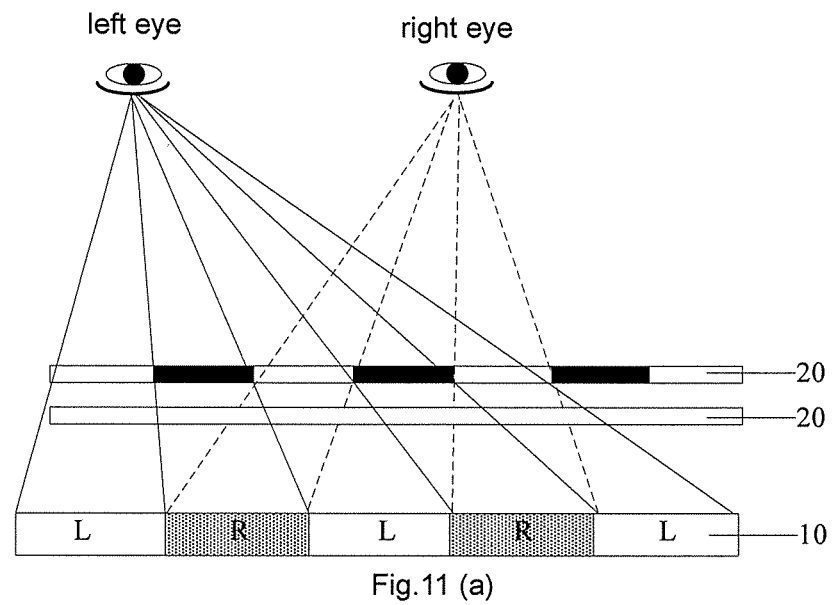
FIG. 11(a) is a first structural diagram of a display device which is used for 3D display provided by some embodiments of the present disclosure.
FIG. 11(b) is a second structural diagram of a display device which is used for 3D display provided by some embodiments of the present disclosure.
Figure 11:
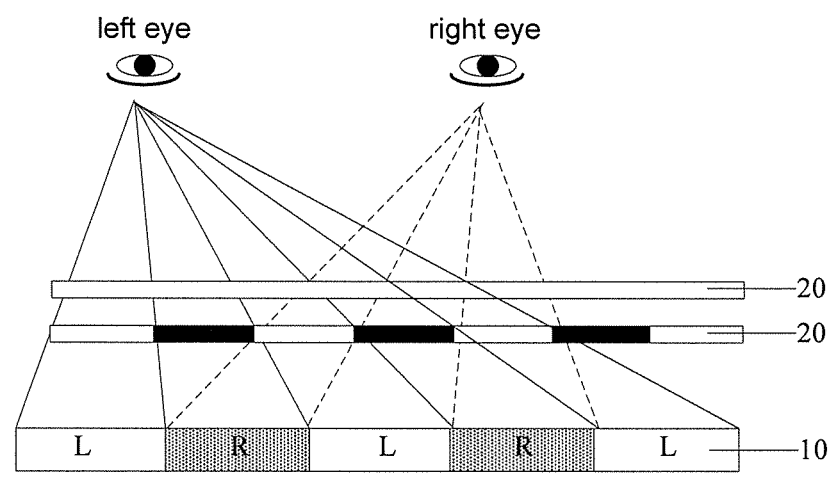

On this basis, in cases when the distance between the display panel 10 and the photonic crystal grating 20 in the grating state is constant, the optimal 3D viewing position of the display device is constant. In cases when the distance between the display panel 10 and the photonic crystal grating 20 in the grating state is changed, the optimal 3D viewing position of the display device shown in FIGS. 11(a) and 11(b) is changed accordingly.

Since the display device includes two or more photonic crystal gratings 20 arranged in stacks, one of the plurality of photonic crystal gratings 20 may be in the grating state while the others are in the fully light-transmitting state to achieve 3D display. Based on this, by controlling the different photonic crystal gratings 20 to be in the grating state, the optimal 3D display may be achieved in a plurality of locations, so that the optimal 3D display may be viewed in a larger area.

In cases when the photonic crystal grating 20 is practically used, the second electrode layer 202 is connected to a voltage terminal. By controlling the voltage(s) of the plurality of strip-shaped electrode units 2011 in the first electrode layer 201 respectively, the photonic crystal grating 20 may be in the fully light-transmitting state or the grating state. Since the voltage of the second electrode layer 202 may be constant in cases when the state of the photonic crystal grating 20 is changed, the second electrode layers 202 of the plurality of photonic crystal gratings 20 are connected to the same voltage terminal so as to simplify the structure of the display device. For example, all of the second electrode layers 202 may be connected to a ground (GND).

Figure 12:
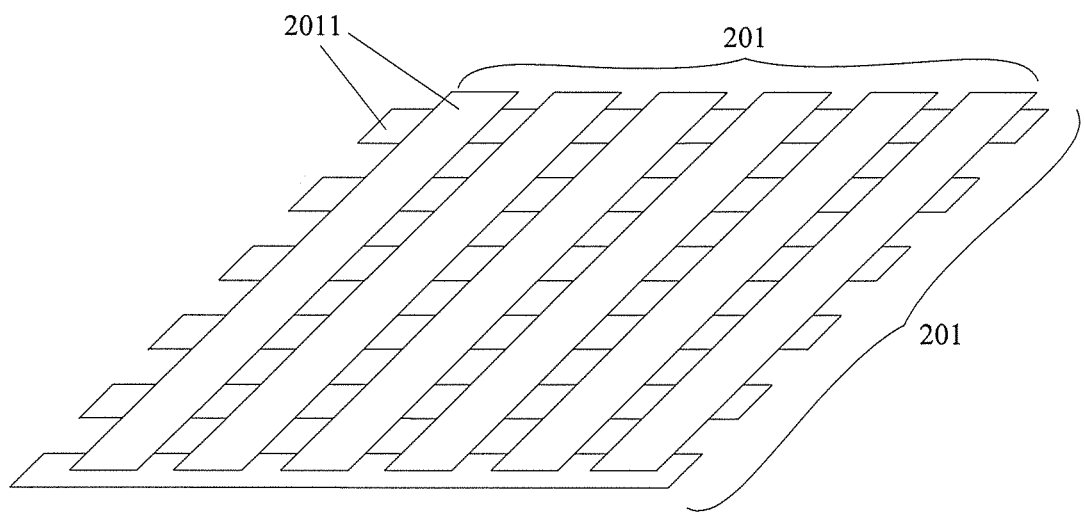
FIG. 12 is a structural diagram of a display device which includes two photonic crystal gratings arranged in stacks provided by some embodiments of the present disclosure.

Further, as shown in FIG. 12, the display device includes two photonic crystal gratings 20 arranged in stacks, and the electrode units 2011 of the two photonic crystal gratings 20 are perpendicular to each other.

The direction in which the plurality of electrode units 2011 of the first electrode layer 201 of the photonic crystal grating 20 are arranged is the same as the direction in which the light-shielding regions and the light-transmitting regions of are arranged when the photonic crystal grating 20 is in the grating state. Based on this, in cases when the electrode units 2011 of the two photonic crystal gratings 20 are perpendicular to each other, the directions in which the light-shielding regions and the light-transmitting regions of the two photonic crystal gratings 20 are arranged are perpendicular to each other when the two photonic crystal gratings 20 are in the grating state.

Since the electrode units 2011 of the two photonic crystal gratings 20 are perpendicular to each other, the direction in which the light-shielding regions and the light-transmitting regions of one photonic crystal grating 20 are arranged is perpendicular to the direction in which the light-shielding regions and the light-transmitting regions of another photonic crystal grating 20 are arranged, when the two photonic crystal gratings 20 are in the grating state. Therefore, the display device may be achieved the 3D display when in landscape or portrait state.

Figure 13:
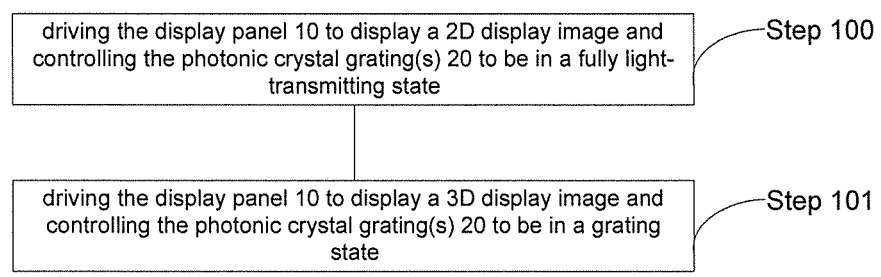
FIG. 13 is a flow chart of a control method for a display device provided by some embodiments of the present disclosure.

Some embodiments of the present disclosure further provide a control method of the display device. As shown in FIG. 13, the method includes the following steps of S100~S101.

S100: driving the display panel 10 to display a 2D display image and controlling the photonic crystal grating(s) 20 to be in a fully light-transmitting state.

Here, the photonic crystal grating(s) 20 is/are in a fully light-transmitting state, and the photonic crystal grating(s) 20 is/are equivalent to transparent glass and does/do not affect the light emitted by the display panel 10.

S101: driving the display panel 10 to display a 3D display image and controlling the photonic crystal grating(s) 20 to be in a grating state.

In case that the display device includes a plurality of photonic crystal gratings 20, one of the photonic crystal gratings 20 is controlled to be in a grating state while the other photonic crystal gratings are controlled to be in a fully light-transmitting state when the display panel 10 displays a 3D display image.

In cases when the display panel 10 displays a 2D display image and the photonic crystal grating(s) 20 is/are in a fully light-transmitting state, the display device may achieve 2D display. In cases when the display panel 10 displays a 3D display image and the photonic crystal grating(s) 20 is/are in a grating state, the display device may achieve 3D display.

In some embodiments of the disclosure, the display device includes two or more photonic crystal gratings 20 arranged in stacks; the step of controlling one of the photonic crystal gratings 20 to be in a grating state includes the following steps of S200~S201.

S200: acquiring the distance from the viewer to the display device.

Here, it is not limited about how to acquire the distance from the viewer to the display device. For example, an infrared camera may be used to acquire the distance from the viewer to the display device.

S201: controlling one of the photonic crystal gratings 20 which is corresponding to the distance acquired in S200 to be in a grating state while other photonic crystal gratings 20 to be in a fully light-transmitting state.

It should be noted that, since one of the photonic crystal gratings 20 corresponding to the distance acquired in S200 is controlled in a grating state, the viewer may see the optimal 3D display effect when the display device performs 3D display.

Since the display device may acquire the distance from the viewer to the display device and control the corresponding one photonic crystal grating 20 according to the distance to be in a grating state while the other photonic crystal gratings 20 are in a fully light-transmitting state, the viewer may see the optimal 3D display effect. Compared with the display device in the prior art, which achieves the optimal 3D viewing effect only at one location, the embodiments of the present disclosure may achieve the optimal 3D viewing effect at multiple locations. Based on this, the viewer does not need to look for the optimal 3D viewing location when viewing the 3D display, while the display device may control the corresponding photonic crystal grating 20 according to the distance from the viewer to the display device to be in a grating state, so that the optimal 3D viewing effect may be achieved when the viewer is at his location.

Further, as shown in FIG. 12, the display device includes first photonic crystal gratings and second photonic crystal gratings that are arranged in stacks, and the electrode units 2011 of the first photonic crystal gratings and the electrode units 2011 of the second photonic crystal gratings are perpendicular to each other.

The direction in which the plurality of electrode units 2011 of the first electrode layer 201 of the photonic crystal grating 20 are arranged is the same as the direction in which the light-shielding regions and the light-transmitting regions are arranged when the photonic crystal grating 20 is in the grating state. Based on this, in cases when the electrode units 2011 of the first photonic crystal gratings and the electrode units 2011 of the second photonic crystal gratings are perpendicular to each other, the direction in which the light-shielding regions and the light-transmitting regions of one type of photonic crystal gratings 20 are arranged and the direction in which the light-shielding regions and the light-transmitting regions of another type of photonic crystal gratings 20 are perpendicular to each other when the two photonic crystal gratings 20 are in the grating state.

Based on this, the step of controlling one of the photonic crystal gratings 20 to be in a grating state when the display panel 10 is in a landscape state includes: controlling one of the second photonic crystal gratings to be in a grating state and the other photonic crystal gratings 20 to be in a fully light-transmitting state; wherein, the direction in which the electrode units 2011 of the second photonic crystal gratings are arranged is parallel to the horizontal viewing direction of the display panel 10 in a landscape state.

The step of controlling one of the photonic crystal gratings 20 to be in a grating state when the display panel 10 is in a portrait state includes: controlling one of the first photonic crystal gratings to be in a grating state and the other photonic crystal gratings 20 to be in a fully light-transmitting state; wherein, the direction in which the electrode units 2011 of the first photonic crystal gratings are arranged is parallel to the horizontal viewing direction of the display panel 10 in a portrait state.

If one of the second photonic crystal gratings is in the grating state while the other photonic crystal gratings 20 are in the fully light-transmitting state when the display panel 10 is in the landscape state, the 3D display may be achieved during the landscape display. If one of the first photonic crystal gratings is in the grating state while the other photonic crystal gratings 20 are in the fully light-transmitting state when the display panel 10 is in the portrait state, the 3D display may be achieved during the portrait display.

The foregoing descriptions are merely specific embodiments of the present disclosure, but the protection scope of the present disclosure is not limited thereto. Within the technical scope disclosed in the present disclosure, anyone skilled in the art may easily conceive changes and substitutions which should be covered by the scope of the present disclosure. Therefore, the protection scope of the present disclosure should be based on the protection scope of the claims.

Additional embodiments including any one of the embodiments described above may be provided by the disclosure, where one or more of its components, functionalities or structures is interchanged with, replaced by or augmented by one or more of the components, functionalities or structures of a different embodiment described above.

What is claimed is:

1. A display device, comprising a display panel and a photonic crystal grating disposed on a light emitting side of the display panel;
   wherein the photonic crystal grating has a fully light-transmitting state and a grating state which is used for 3D display,
   wherein the photonic crystal grating comprises:
      a first electrode layer and a second electrode layer disposed oppositely, and
      a photonic crystal layer disposed between the first electrode layer and the second electrode layer,
   wherein the photonic crystal layer comprises:
      a liquid medium layer and charged particles that are distributed in a lattice structure in the medium layer and are capable of moving in the medium layer under an action of an electric field, and
   wherein the first electrode layer comprises:
      a plurality of stripe-shaped electrode units arranged side by side in a horizontal viewing direction of the display panel; and each stripe-shaped electrode unit extends in a direction perpendicular to the horizontal viewing direction.

2. The display device according to claim 1, wherein, the plurality of stripe-shaped electrode units are arranged side by side with an interval between the adjacent two stripe-shaped electrode units.

3. The display device according to claim 2, wherein, an insulator is provided in the interval between the adjacent two stripe-shaped electrode units.

4. The display device according to claim 1, wherein, both of the width of a single stripe-shaped electrode unit and the interval between the adjacent two stripe-shaped electrode units are designed in the range of micrometers.

5. The display device according to claim 1, wherein, grating parameters of the photonic crystal grating under the grating state are adjusted by controlling a voltage of each of the stripe-shaped electrode units;
   the grating parameters comprises locations of light-transmitting regions and light-shielding regions formed in the photonic crystal grating under the grating state, and widths of the light-transmitting regions and the light-shielding regions.

6. The display device according to claim 5, wherein, in the case that the width of each stripe-shaped electrode unit has been determined, the amount of the stripe-shaped electrode units within a light-shielding region or within a light-transmitting region is changed by controlling the voltage of each of the stripe-shaped electrode units, and in turn the widths of the light-shielding regions and the light-transmitting regions are changed.

7. The display device according to claim 1, wherein, the horizontal viewing direction refers to a horizontal direction when a person views a display screen.

8. The display device according to claim 1, wherein,
   the charged particles are at least one selected from the group of metal particles, metal alloy particles, or metal compound particles; or,
   the charged particles are particles formed by externally encapsulating a polymer material with a metal material, a metal alloy material, or a metal compound material.

9. The display device of claim 1, wherein, the medium layer is colloidal solution.

10. The display device of claim 1, wherein, the display device comprises two or more of the photonic crystal gratings arranged in stacks in a direction perpendicular to the board surface of the display panel.

11. The display device according to claim 10, wherein, the second electrode layers of the plurality of photonic crystal gratings are connected to the same voltage terminal.

12. The display device according to claim 10, wherein, the display device comprises two photonic crystal gratings arranged in stacks, and the electrode units of the two photonic crystal gratings are perpendicular to each other.

13. The display device according to claim 1, wherein, one stripe-shaped electrode unit is shaped as an integral whole stripe or is formed of a plurality of sub-electrode units.

14. A control method of a display device according to claim 1, comprising:
   driving the display panel to display a 2D display image and controlling the photonic crystal grating(s) to be in a fully light-transmitting state; and
   driving the display panel to display a 3D display image and controlling one of the photonic crystal grating(s) to be in a grating state,
   wherein, the step of controlling one of the photonic crystal grating(s) to be in a grating state comprises:
   controlling a voltage of each of the stripe-shaped electrode units in the one of the photonic crystal grating(s) to adjust grating parameters of the photonic crystal grating under the grating state, and
   the grating parameters comprises locations of light-transmitting regions and light-shielding regions formed in the photonic crystal grating under the grating state, and widths of the light-transmitting regions and the light-shielding regions.

15. The control method according to claim 14, wherein, the display device comprises two or more photonic crystal gratings which are arranged in stacks;
   the step of controlling one of the photonic crystal gratings to be in a grating state comprises:
   acquiring the distance from the viewer to the display device;
   controlling one of the photonic crystal gratings which is corresponding to the distance to be in a grating state while other photonic crystal gratings to be in a fully light-transmitting state.

16. The control method according to claim 14, wherein, the display device comprises first photonic crystal gratings and second photonic crystal gratings which are arranged in stacks, and the electrode units of the first photonic crystal gratings and the electrode units of the second crystal gratings are perpendicular to each other;

the step of controlling one of the photonic crystal gratings to be in a grating state in cases when the display panel is in landscape state comprises:

controlling one of the second photonic crystal gratings to be in a grating state while other of the photonic crystal gratings to be in a fully light-transmitting state; wherein a direction in which the electrode units in the second photonic crystal gratings are arranged is parallel to a horizontal viewing direction of the display panel in landscape state;

the step of controlling one of the photonic crystal gratings to be in a grating state in cases when the display panel is in portrait state comprises:

controlling one of the first photonic crystal gratings to be in a grating state while other of the photonic crystal gratings to be in a fully light-transmitting state; wherein a direction in which the electrode units in the first photonic crystal gratings are arranged is parallel to a horizontal viewing direction of the display panel in portrait state.

\* \* \* \* \*